United States Patent [19]
Nikias et al.

[11] Patent Number: 6,037,892
[45] Date of Patent: Mar. 14, 2000

[54] METHOD FOR AUTOMATIC FOCUSING OF RADAR OR SONAR IMAGING SYSTEMS USING HIGH-ORDER MEASUREMENTS

[75] Inventors: Chrysostomos L. Nikias, Rancho Palos Verdes; Vasilis Z. Marmarelis, Irvine; Dae Cheol Shin, Diamond Bar, all of Calif.

[73] Assignee: MultiSpec Corporation, Huntington Beach, Calif.

[21] Appl. No.: 09/085,662

[22] Filed: May 28, 1998

[51] Int. Cl.$^7$ .............................. G01S 13/90; G01S 15/89
[52] U.S. Cl. ....................... 342/25; 342/159; 342/194; 342/195; 367/7; 367/87; 367/88
[58] Field of Search ................... 367/7, 87, 88, 367/135; 342/22, 25, 159, 160, 161, 162, 190–196

[56] References Cited

U.S. PATENT DOCUMENTS

| | | | |
|---|---|---|---|
| 4,924,229 | 5/1990 | Eichel et al. | 342/25 |
| 4,999,635 | 3/1991 | Niho | 342/25 |
| 4,999,653 | 3/1991 | Niho | 342/25 |
| 5,043,734 | 8/1991 | Niho | 342/25 |
| 5,184,134 | 2/1993 | Niho et al. | 342/25 |
| 5,200,754 | 4/1993 | Niho | 342/25 |
| 5,248,976 | 9/1993 | Niho et al. | 342/25 |
| 5,608,404 | 3/1997 | Burns et al. | 342/25 |
| 5,952,955 | 9/1999 | Kennedy et al. | 342/25 |

OTHER PUBLICATIONS

"Phase Gradient Autofocus—A Robust Tool for High Resolution SAR Phase Correction," by D.E. Wahl et al., IEEE Tranactions on Aerospace and Electronic Suystem, vol. 30, No. 3, Jul. 1994, pp. 827–835.

"Speckle processing method of synthetic–aperture–radar phase correction," by P.H. Eichel et al., vol. 14, No. 1, Jan. 1, 1989, Optical Society of America, Optics Letters, pp. 1–3.

"Phase–gradient algorithm as an optimal estimator of the phase derivative," by P.H.Eichel et al., vol. 14, No. 20, Oct. 15, 1989, Optical Society of America, Optics Letters, pp. 1101–1103.

*Primary Examiner*—Bernarr E. Gregory
*Attorney, Agent, or Firm*—Price, Gess & Ubell

[57] ABSTRACT

Automatic focusing of radar or sonar imaging systems, for example, synthetic aperture radar (SAR) or synthetic aperture sonar (SAS) systems, is accomplished by using high order measurements, such as the quadruple product of the range compressed signal g(x). The phase error is estimated by a recursive or non-recursive algorithm from the phase of the quadruple product. The estimated phase error is applied to the range-compressed SAR or SAS image data which is then azimuth compressed to obtain the focused image data.

27 Claims, 8 Drawing Sheets

METHOD FOR AUTOMATIC FOCUSING OF RADAR OR SONAR IMAGING SYSTEMS USING HIGH-ORDER MEASUREMENTS

BACKGROUND OF THE INVENTION

1. Field of the Invention

The present invention relates to radar or sonar imaging systems and, more particularly, pertains to a new and improved method for enhancing the resolution of active systems such as synthetic aperture radar (SAR) or synthetic aperture sonar (SAS) images or of passive systems such as sensor array sonar images, by means of high-order measurements for autofocus processing.

2. Description of Related Art

Radar is an important sensor technology because it provides an all-weather, day or night capability to detect or locate objects and to generate a spatial, visual representation of the electromagnetic reflectivity of an illuminated scene. Imaging radar provides a two-dimensional representation of scatterers (objects of interest) in the illuminated scene that contains detailed information with fine spatial resolution in the range and cross-range (or azimuth) directions. A large antenna aperture is required in conventional imaging radar systems to achieve a narrow beamwidth and, consequently, fine azimuth resolution. Practical constraints on antenna size have led to the introduction of synthetic aperture radar (SAR) as an alternative means for improving azimuth resolution by synthesizing pulse-to-pulse return signals collected by a moving platform with a small antenna. The signal synthesis from many successive locations of the moving platform can accomplish what would otherwise require a larger antenna aperture.

Normal SAR data collection requires phase coherence, not only within each pulse for range resolution, but also from pulse to pulse over the collection time needed for azimuth resolution. The platform position affects the pulse-to-pulse phase coherence over the synthetic aperture. The platform position history includes both planned changes and unplanned perturbations of the antenna location. Extraneous platform motion creates phase effects in the SAR signal history that the autofocus processor must cancel in order to maintain phase coherence and achieve good image quality. To use the synthetic aperture concept for generating fine azimuth resolution in radar imagery, the SAR system must account for the distance from the target to the radar antenna at the transmission time of each radar pulse. For airborne SAR, an inertial navigation system (INS) and possibly a global positioning system (GPS) receiver are onboard the SAR platform to measure its relative position and motion. The needed information can also be obtained from the received radar signals themselves. This approach involves measuring the effects of the motion (phase errors) without explicitly measuring the associated motions. Various autofocus techniques are based on measuring phase errors only. Autofocus techniques currently used improve image clarity by alleviating phase errors present after conventional motion compensation and image formatting procedures. Autofocus with respect to SAR or SAS imaging is the computer-automated estimation and subsequent removal of these phase errors. In SAR, these techniques may replace motion measurement entirely or they may simply be an adjunct to actual motion measurements.

In passive systems such as in sensor array sonar that utilize multiple sensors displaced from each other in water, the water medium tends to phase distort the wavefront being received by the sensor array creating a similar phase error problem as encountered in SAR and SAS imaging systems.

For a spotlight radar system, the model for the azimuthal signal g(x) over the synthetic aperture duration $T_a$ from a single range bin is:

$$g(x) = ae^{j\omega_0 t + j\phi_0 + j\phi_e(x)}, \quad -\frac{T_a}{2} \leq t \leq \frac{T_a}{2} \quad (1)$$

where a $\omega_0$, and $\phi_0$ represent the magnitude, frequency, and phase of signal history, respectively; and $\phi_e(x)$ is the phase error present in the signal history.

When the phase error term is a quadratic polynomial, conventional methods to estimate or compensate the phase error include the mapdrift (MD) algorithm and the phase difference (PD) algorithm which found significant application in early fine-resolution imaging radars. See W. G. Carrara, R. S. Goodman, and R. M. Majewski, *Spotlight Synthetic Aperture Radar: Signal Processing Algorithms*, Artech Hose, Boston, 1995. However, applicability of these algorithms is limited to correction of a quadratic phase error which cannot be considered a general model for all phase errors. Extension of the MD algorithm to estimate phase errors of a higher degree (than quadratic) is possible by dividing the signal history aperture into more than two subapertures. In general, N subapertures are adequate to estimate the coefficients of an Nth-order polynomial error model. See C. E. Mancill and J. M. Swiger, "A Map Drift Autofocus Technique for Correcting Higher Order SAR Phase Errors," *27th Annual Tri-Service Radar Symposium Record*, Monterey, Calif., June, 1981.

The phase gradient autofocus (PGA) algorithm is currently the leading algorithm for estimating higher degree phase errors. See U.S. Pat. No. 4,924,229, P. H. Eichel, D. C. Ghiglia, and C. V. Jakowatz, "Phase Correction System for Automatic Focusing of Synthetic Aperture Radar," May 8, 1990. The algorithm is not model-based and its implementation does not require explicit selection of a maximum degree for the model of the phase error being estimated. The PGA algorithm is accepted as the state of the art for autofocus processing in a general context (higher degree). The PGA algorithm evaluates the derivative $\dot{g}_0(x)$ of the azimuthal signal $g_0(x)$, which is computed from g(x) after appropriate frequency shifting by $\omega_0$ and windowing (application of weighting functions) in the frequency domain. Since:

$$\dot{g}_0(x) = j\dot{\phi}_e(x)g_0(x) \quad (2)$$

where $\dot{\phi}_e(x)$ is the time derivative of the phase error, we can estimate $\dot{\phi}_e(x)$ using the computed values of $\dot{g}_0(x)$ and the measured values $g_0(x)$ as:

$$\hat{\dot{\phi}}_e(x) = \frac{\text{Im}\{\dot{g}_0(x)g_0^*(x)\}}{|g_0(x)|^2} \quad (3)$$

where $g_0^*(x)$ is the complex conjugate of $g_0(x)$. Integration of the phase error gradient estimate $\hat{\dot{\phi}}_e(x)$ provides the phase error estimate $\hat{\phi}_e(x)$ to within a constant. The phase error gradient is usually estimated over several range bins. To obtain satisfactorily good image quality, one has to apply the PGA algorithm iteratively with some effective criterion for terminating algorithm iteration, e.g., a pre-assigned threshold value applied to the mean-square value of the estimated phase error at each iteration.

To focus a SAR image, the prior art estimates and compensates the phase error iteratively. Also, the derivative computation of a discrete-time signal (with or without FFT)

is very sensitive to additive noise. The present invention, on the other hand, achieves SAR, SAS, and sensor arrays image autofocusing without iterative processing, by using high-order measurements and a computationally efficient process. Furthermore, derivative terms that can be a source of significant estimation errors in the presence of noise in the data are not used.

OBJECTS AND SUMMARY OF THE INVENTION

It is an object of this invention to provide a method for processing blurred SAR, SAS, or sensor array sonar images in order to improve the image quality by estimating and compensating the corresponding phase errors in a non-iterative fashion.

This object and the general purpose of this invention is accomplished by a method that utilizes high-order measurements of the signal history to estimate the general (i.e., non-quadratic) phase error in the signal history. The focused image is obtained by compensation of the phase error only once, without iterations. Only the phases of the quadruple products of the signal samples are utilized, making the process computationally efficient and robust to noise in the data.

BRIEF DESCRIPTION OF THE DRAWINGS

Other objects and many of the attendant advantages of this invention will be readily appreciated as the same becomes better understood by reference to the following detailed description when considered in conjunction with the accompanying drawings, in which like reference numerals designate like parts throughout the figures thereof, and wherein.

DESCRIPTION OF THE PREFERRED EMBODIMENTS

The following description is provided to enable any person skilled in the art to use the invention, and sets forth the best means contemplated by the inventors for carrying out their invention. Various modifications, however, will remain readily apparent to those skilled in the art, since the generic principles of the present invention have been defined herein specifically to provide a method and apparatus for processing reflected data in an echo location imaging system to estimate and compensate phase errors due to motion without requiring iterative computational procedures.

Conventional radar or sonar autofocusing techniques require iterative computational procedures until a satisfactory image quality is obtained. The present invention estimates and compensates for phase errors only once, obtaining image quality as good or better than the iterative method. The process of the invention does not use any specific phase error model and, therefore, has wide applicability.

Figure 1:
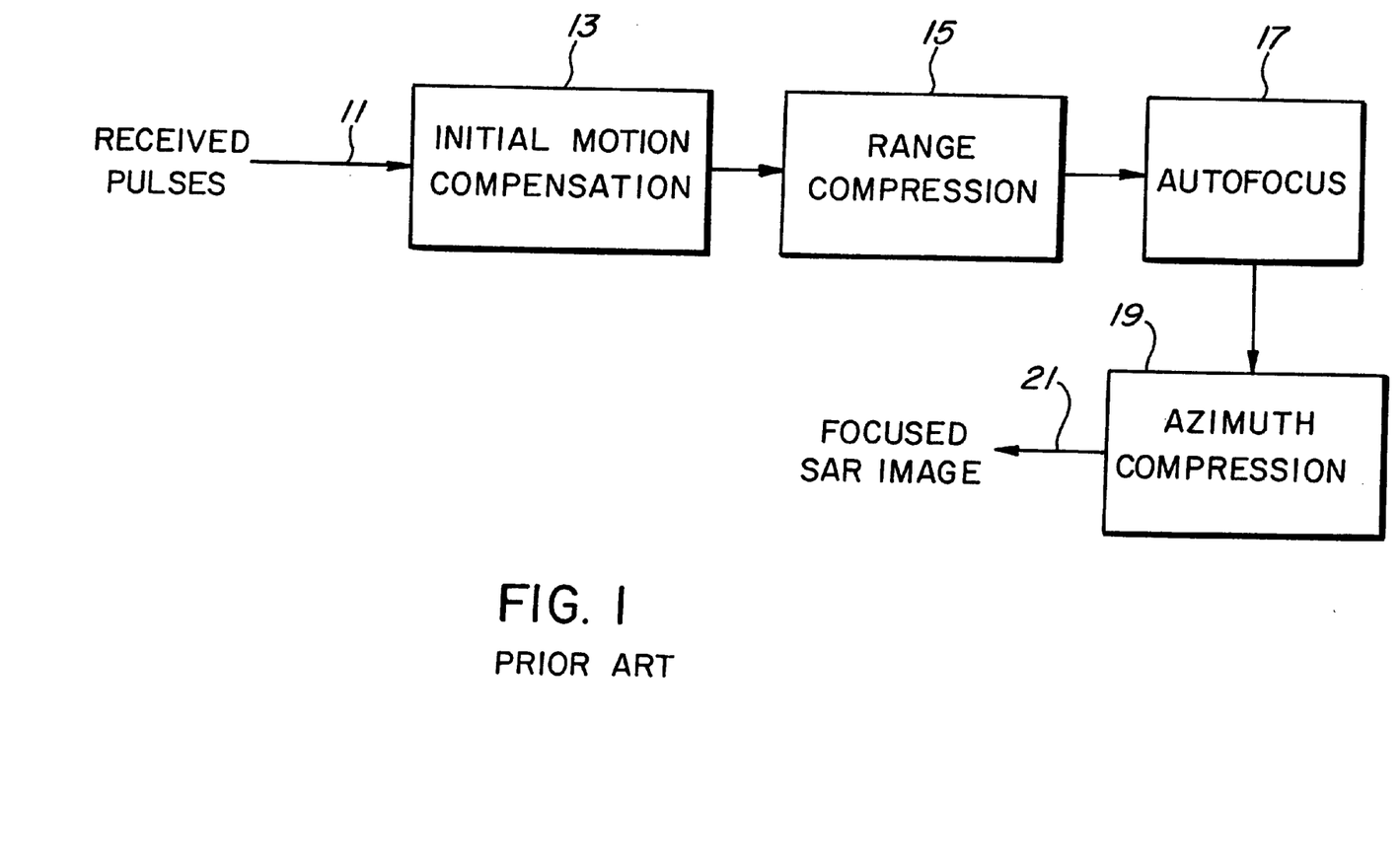
FIG. 1 is a block diagram of general SAR image processing with autofocus.

The present invention may be implemented for autofocus in a standard SAR imaging system as shown in FIG. 1. The imaging system takes the signals 11 to be processed, and performs motion compensation 13, and range compression 15 before the autofocus operation 17. After autofocus, the data is azimuth compressed 19, producing the focused image data 21. Implementation of the system of FIG. 1 requires an autofocus algorithm 17.

Figure 2:
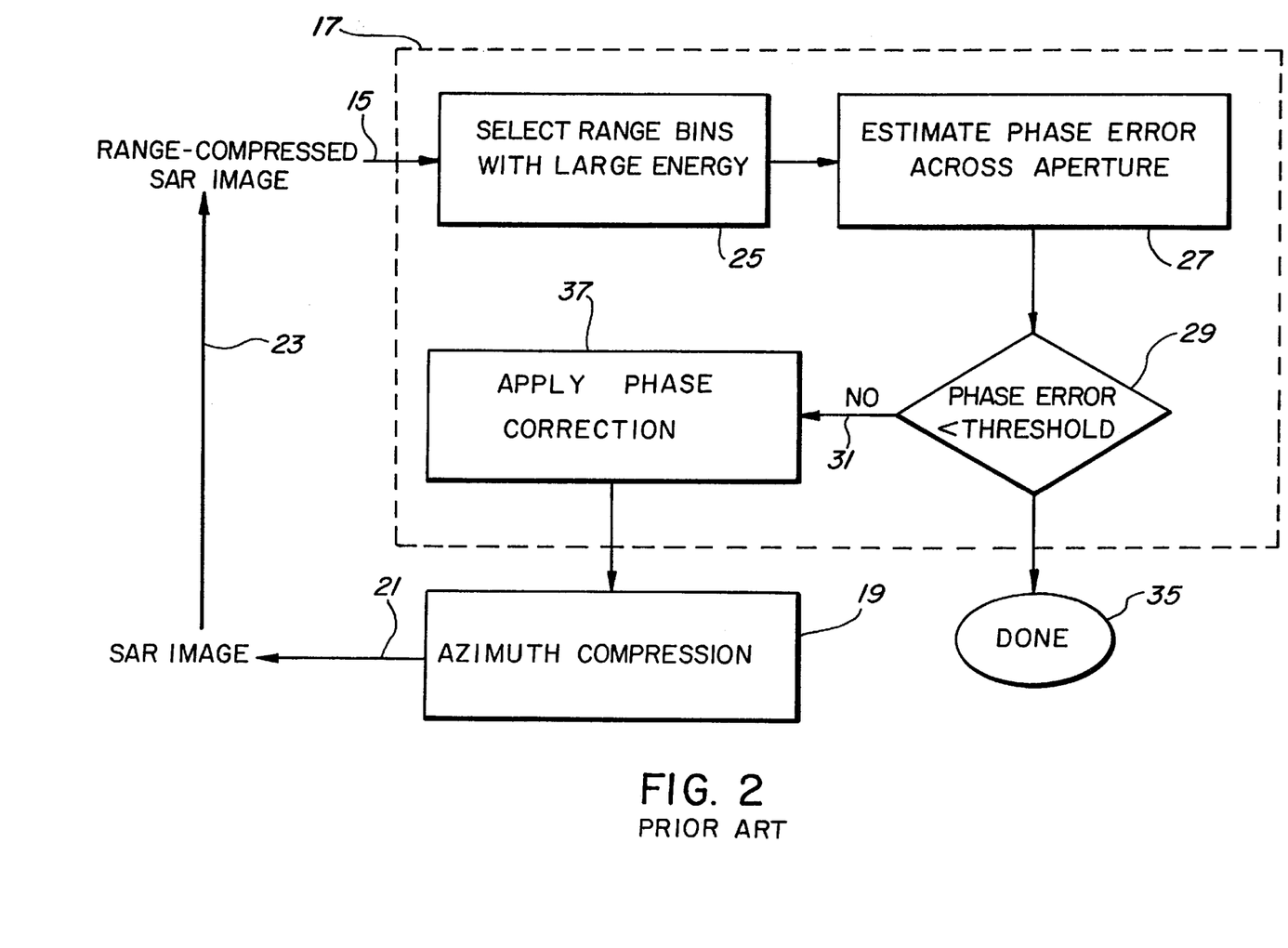
FIG. 2 is a block diagram of a prior art autofocus system.

FIG. 2 shows a block diagram implementation of a prior art algorithm for autofocusing SAR images that has a loop 15-21-23, for iteratively applying phase correction, provided the phase error estimate is not less than a certain pre-selected threshold. The loop consists of three steps: the phase correction step 25-27-29-37, the azimuth compression step 19 for a preliminary SAR image 21, and step 23 to transform the preliminary SAR image to the corresponding range-compressed SAR image. Among these steps, the last step 23 may be computationally very intensive.

The present invention simply replaces the prior art autofocus algorithm without major modification to the system. The present invention utilizes high-order measurements, such as the following quadruple product of g(x) given in Equation (1):

$$g_4(x_1, x_2, x_3, x_4) = g(x_1)g(x_2)g^*(x_3)g^*(x_4) \qquad (4)$$

where $g^*$ is the complex conjugate of $g(x)$. When $x_3=0$ and $x_4=x_1+x_2$, the above expression becomes $$g_4(x_1, x_2, 0, x_1+x_2) = a^4 e^{j\{\phi_e(x_1)+\phi_e(x_2)-\phi_e(0)\phi_e(x^{1+x_2})\}} \qquad (5)$$

in which the terms related to the frequency and phase of the signal history disappear. Equation (5) indicates that the phase of $g_4$ is:

$$\psi_4(x_1, x_2, 0, x_1+x_2) = \phi_e(x_1) + \phi_e(x_2) - \phi_e(0) - \phi_e(x_1+x_2). \qquad (6)$$

With proper choice of $x_1$ and $x_2$, Equation (6) can be solved to yield an estimate of the phase error $\phi_e(x)$, using a variety of well known estimation algorithms. For more in formation of various phase estimation algorithms, see Chrysostomos L. Nikias and Athina P. Petropulu, *Higher-Order Spectral Analysis: A Nonlinear Signal processing Framework*, Chapters 5 and 6, Prentice-Hall, Englewood Cliffs, N.J., 1993.

As an example, we use here the Bartelt-Lohman-Wirnitzer phase estimation algorithm. Assigning $x_1=j$ and $x_2=i-j$, Equation (6) becomes $$\psi_4(j, i-j, 0, i) = \phi_e(j) + \phi_e(i-j) - \phi_e(i). \qquad (7)$$

Then, the phase error estimate of $\phi_e$ can be obtained by the recursive equation $$\phi_e(i) = \phi_e(j) + \phi_e(i-j) - \psi_4(j, i-j, 0, i). \qquad (8)$$

where $-T_a/2 \leq i \leq T_a/2$ and j is a fixed constant satisfying $|j| \leq T_a/2$. Usually, we select j=1 and the recursive equation becomes $$\phi_e(i) = \begin{cases} \varphi_4(1, i, 0, i+1) + \phi_e(i+1) - \phi_e(1) & \text{for } i < 0 \\ \phi_e(1) + \phi_e(i-1) - \varphi_4(1, i-1, 0, i) & \text{for } i > 1 \end{cases} \quad (9)$$

In order to solve the recursive Equation (9), we must specify the initial phase difference $[\phi_e(1)-\phi_e(0)]$. An arbitrary choice for this phase difference will result, in general, in an arbitrary linear phase component in the solution $\phi_e(x)$, which will cause an image shift with out distortions. This shift can be restored in the final focused image. This algorithm may not be able to focus an image for which there is no range bin with a dominant peak along the azimuth. However, by employing a proper window, convergence is assured.

Figure 3:
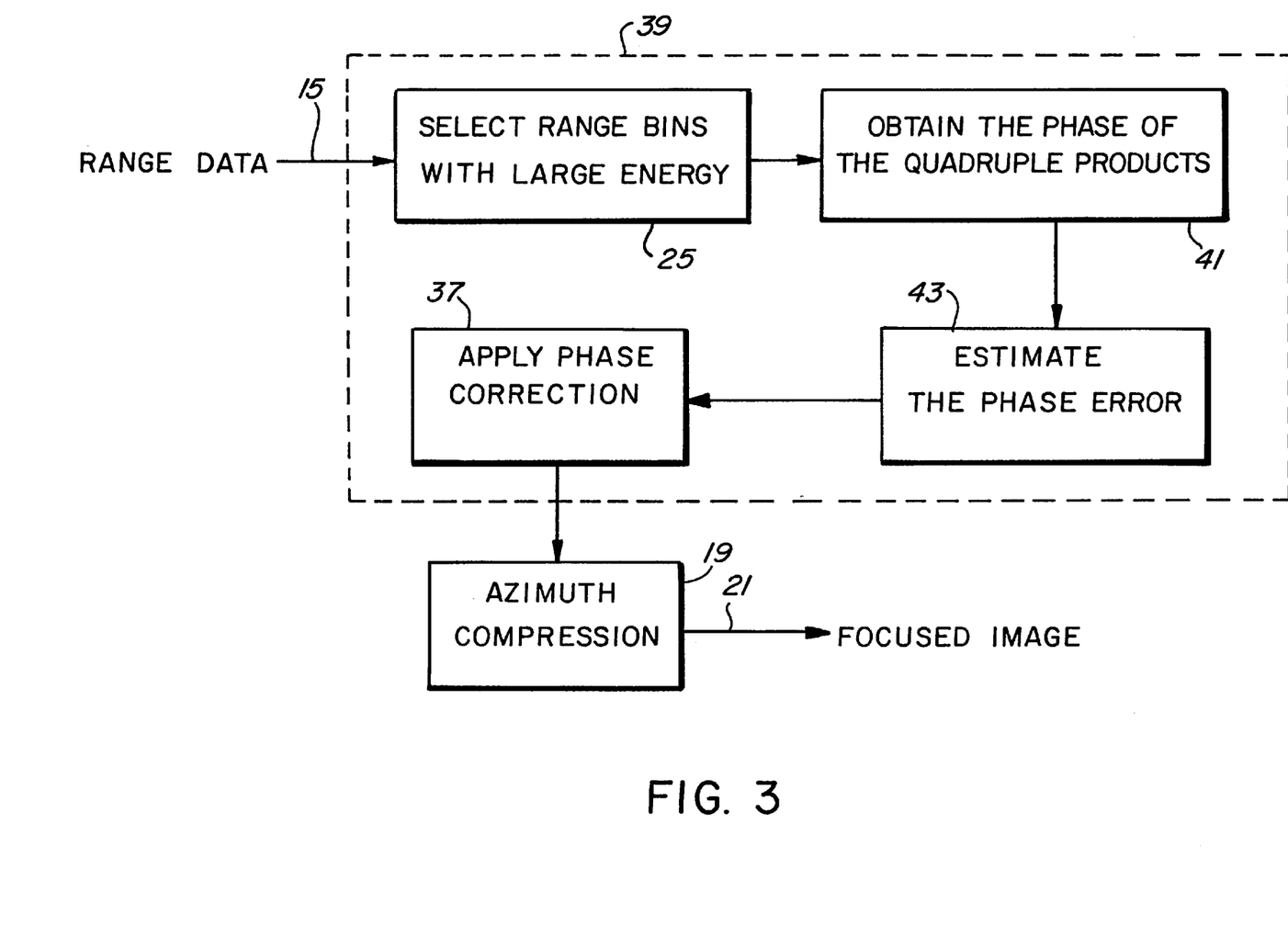
FIG. 3 is a block diagram of the autofocus system according to the present invention.

FIG. 3 shows a block diagram 39 of the autofocus procedure of the present invention for autofocusing SAR images, which we will call the HOSP Autofocus (HOSPA) algorithm. The HOSPA algorithm estimates the phase error 41–43 and compensates for this phase error 37 in the range image data 15 to obtain a focused image 21 by azimuth compression 19 without any iterations. The select range bin fumction 25, selects the range bin with the largest energy i.e., the dominant peak of the magnitude of the complex rang-compressed data for some azimuth interval. Phase function 41 forms the quadruple products of the complex rang-compressed data for four azimuths at the selected range bin and obtains the phase of the quadruple products at the azimuth locations specified in Eq. 6. The phase error estimate function 43 estimates the phase error for each azimuth location from the phase of the quadruple product using either a recursive or non-recursive algorithm e.g., a recursive algorithm would be the Bartelt-Lohman-Wirnitzer algorithm described by Eqs. 7–9. The apply phase correction function 37 applies a phase correction to the complex range-compressed data for each azimuth location using the estimated phase error, from function 43. The azimuth compression function 19 performs azimuth compression according to prior art teaching using the phase corrected data from the phase correction function 37 in order to form the final (focused) image. This process can be repeated for other range bins with large energy. The obtained phase error estimates can be averaged over these several range bins for each azimuth location.

Although the invention has been described in terms of using a recursive phase error estimator (or recovery) algorithm, non-recursive algorithms may be used as well with satisfactory results. An example of phase recovery algorithms, both recursive and non-recursive, that may be used with the present invention are:

1. The *Brillinger Algorithm*: recursive algorithm; D. R. Brillinger, "The Identification of a particular Nonlinear Time Series System." *Biometrika*, Vol. 64, 1977.

2. The *Lii-Rosenblatt Algorithm*: recursive algorithm; K. S. Lii and M. Rosenblatt, "Deconvolution and Estimation of Transfer Function Phase and Coefficients for Non-Gaussian Linear Processes," *Ann. Statist.*, Vol. 20, 1982.

3. The *Matsuoka-Ulrych Algorithm*: non-recursive algorithm; T. Matsuoka and T. J. Ulrych, "Phase Estimation Using the Bispectrum," *Proceedings of IEEE*, Vol. 72, 1984.

4. Non recursive algorithm by J. C. Marron, P. P. Sanchez, and R. C. Sullivan, "Unwrapping Algorithm for Least-Squares Phase Recovery from the Modulo ZTT Bispectrum Phase," *J. Opt. Soc. Am.*, Vol. A7, 1990.

5. Non-recursive algorithm by M. Rangoussi and G. B. Giannakis, "FIR Modeling Using Long-Bispectra: Weighted Least-Squares Algorithms and Performance Analysis," *IEEE Trans. On Circuits and Systems*, Vol. 38, 1991.

Table 1 shows the required numbers of multiplications for the PGA algorithm and the HOSPA algorithm (using the Bartelt-Lohman-Wirnitzer phase estimation algorithm), when the sizes of azimuth and range are M and N, respectively, and the number of iterations for the PGA algorithm is L. In this table, we assume that the number of multiplications for fast Fourier transform (FFT) is $M \log_2 M$ for a (real or complex) sequence whose length is M. This table illustrates that the present invention is computationally very efficient, about three orders of magnitude more efficient than the leading autofocus algorithm (PGA).

TABLE 1

| Number of Multiplications | PGA Algorithm $LM\{3N \log_2 M + 18N + 1\}$ | Present Invention $2M(N \log_2 M + 3N + 6)$ |
|---|---|---|
| M = N = 128 and L = 8 | $5.1128 \times 10^6$ | $3.2922 \times 10^5$ |
| M = N = 256 and L = 6 | $1.6517 \times 10^7$ | $1.4449 \times 10^6$ |
| M = N = 512 and L = 6 | $7.0782 \times 10^7$ | $6.2976 \times 10^6$ |
| M = N = 1,024 and L = 6 | $3.0199 \times 10^8$ | $2.7275 \times 10^7$ |

The illustrative examples that follow relate to SAR image systems, but it should be kept in mind that the same process can be applied to any imaging system (e.g., SAS) for the purpose of autofocusing.

Figure 4:
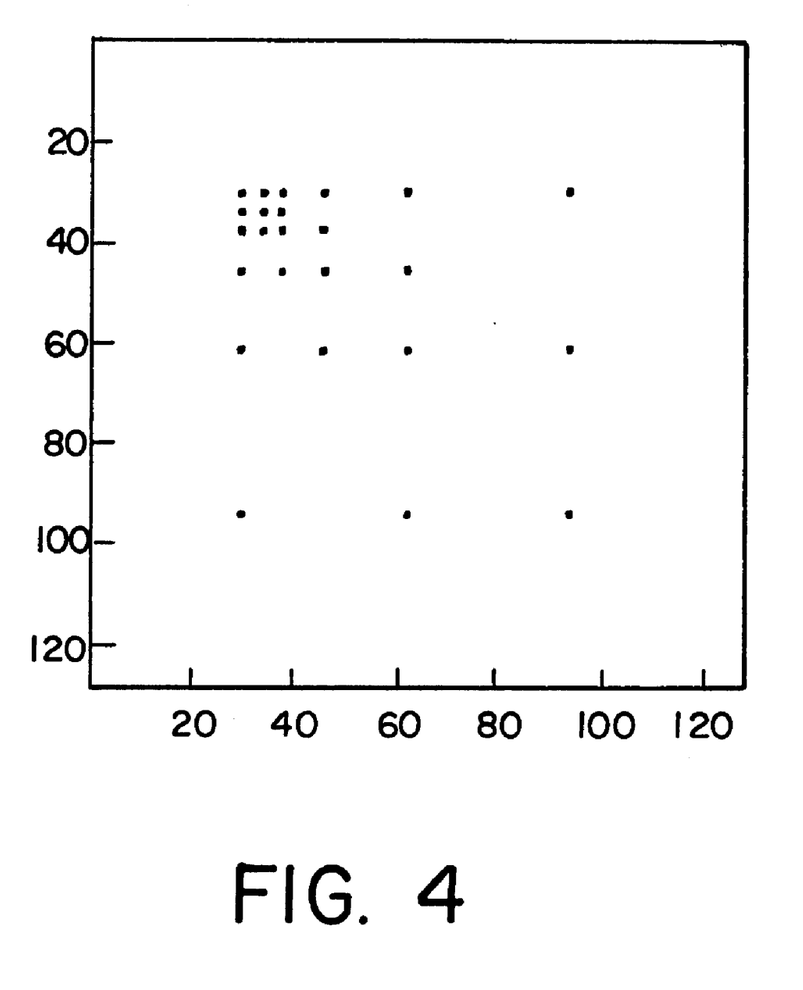
FIG. 4 is a spotlight SAR image of a synthetic dot pattern without any phase errors.
Figure 5:
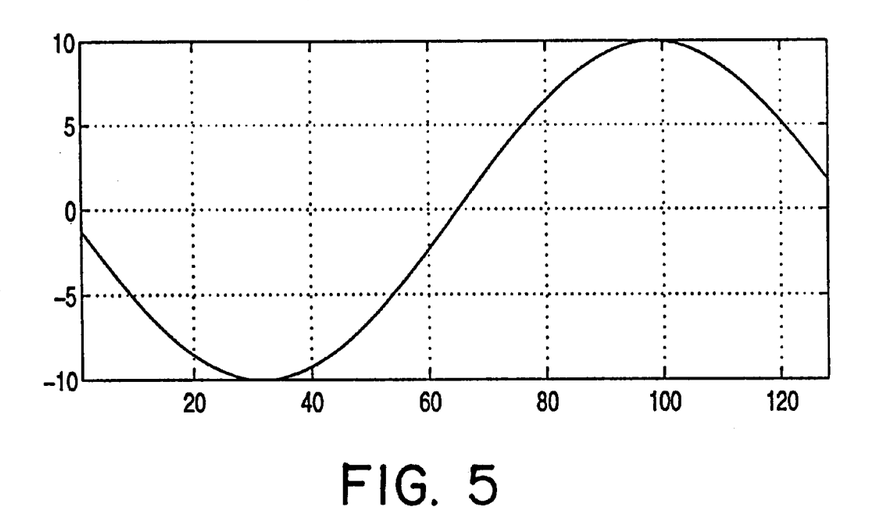
FIG. 5 is a signal diagram of a phase error imposed on the SAR image of FIG. 4.
Figure 6:
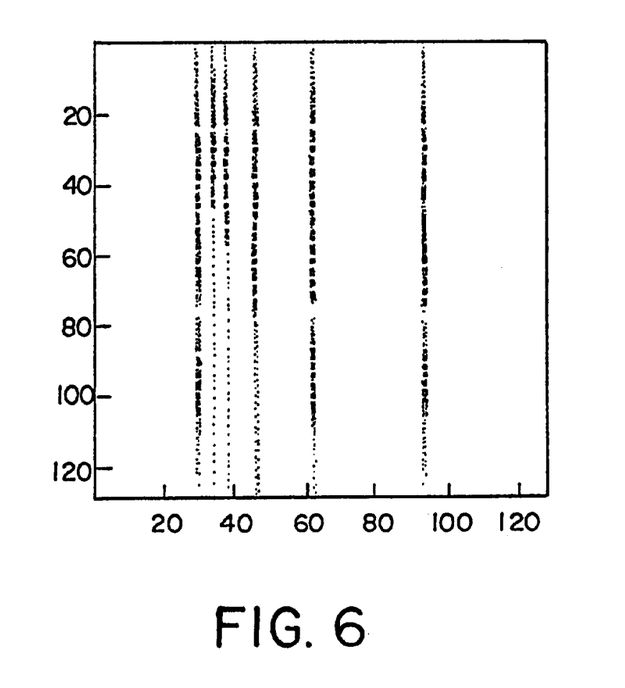
FIG. 6 is the spotlight SAR image of FIG. 4 with the phase error of FIG. 5.
Figure 7:
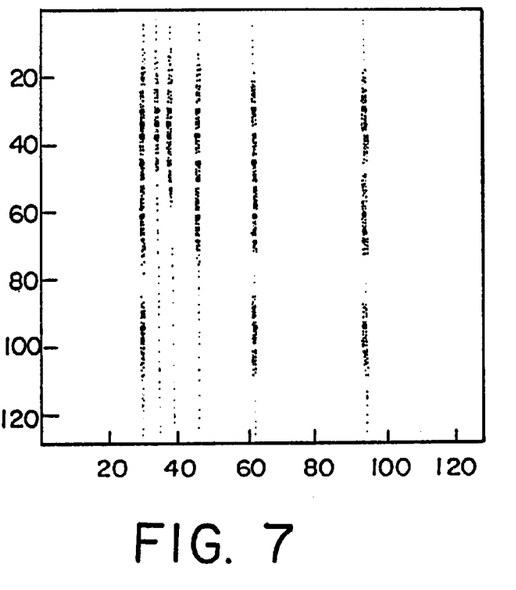
FIG. 7 is the spotlight SAR image of FIG. 6, after being focused by the PGA algorithm with one iteration.
Figure 8:
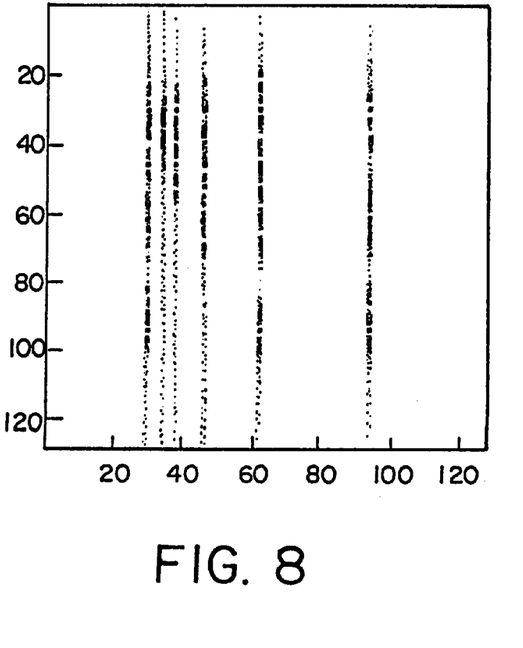
FIG. 8 is the spotlight SAR image of FIG. 6, after being focused by the PGA algorithm with four iterations.
Figure 9:
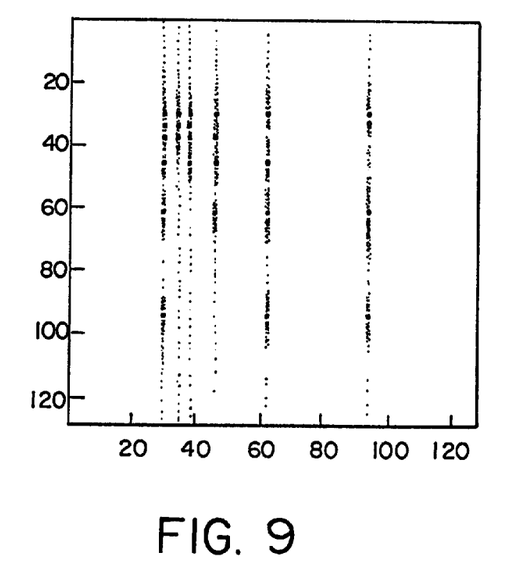
FIG. 9 is the spotlight SAR image of FIG. 6, after being focused by the PGA algorithm with eight iterations.

FIG. 4 illustrates a spotlight SAR image of a synthetic grid without any phase errors. Introducing the phase error shown in FIG. 5 results in the blurred image of FIG. 6. When one applies the PGA algorithm, which is considered the leading autofocus algorithm, the resulting focused PGA images at 1, 4 and 8 iterations are shown in FIGS. 7, 8, and 9, respectively. It is evident that the PGA algorithm requires several iterations to achieve a somewhat focused image, although considerable blurring still remains after 8 iterations.

Figure 10:
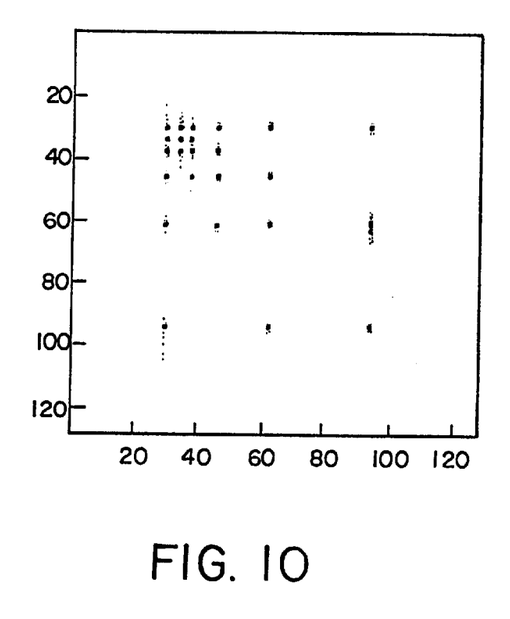
FIG. 10 is the spotlight SAR image of FIG. 6, after being focused by the present invention.

On the other hand, the HOSPA algorithm achieves a near perfect result without any iterations as shown in FIG. 10.

Figure 11:
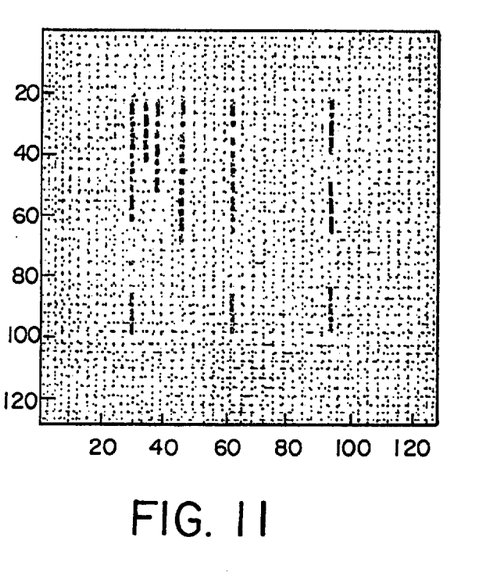
FIG. 11 is the focused spotlight SAR image of FIG. 9, with white Gaussian noise added to the image data.
Figure 12:
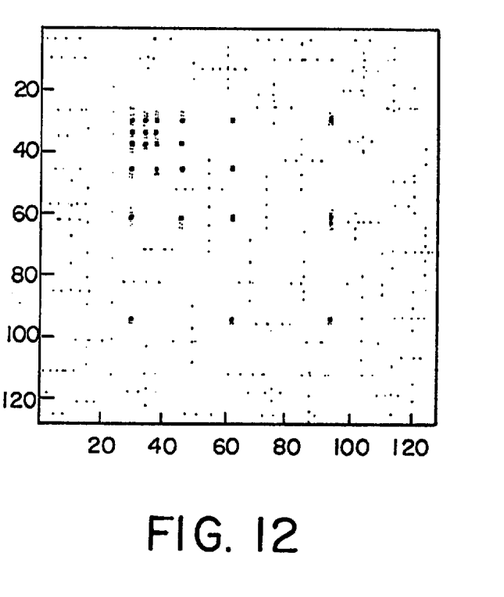
FIG. 12 is the focused spotlight SAR image of FIG. 10, with white Gaussian noise added to the image data.

An additional advantage of the present invention over the leading PGA algorithm is its robustness to noise, i.e., better autofocusing in the presence of noise. This is illustrated by example in FIGS. 11 and 12. Noise is added to the previously analyzed image and the two algorithms are applied. The resulting image for the PGA algorithm (after 8 iterations) is shown in FIG. 11. The resulting image for the HOSPA algorithm of the present invention is shown in FIG. 12. The superior performance of the present invention is evident.

The present invention may also be used in stripmap SAR of SAS image data. Modifications of the described preferred embodiment can be configured without departing from the scope and spirit of the invention. Therefore, it is to be understood that, within the scope of the appended claims, the invention may be practiced other than as specifically described herein.

What is claimed is:

1. A method of correcting phase errors in imaging data, the steps of the method comprising:
   receiving range imaging data;
   generating multiple products of azimuth bins at selected range bins;
   obtaining the phase of the generated multiple products;
   estimating the phase errors of the received imaging data using the phases of the multiple products; and
   applying a phase correction based on the estimated phase errors to the received range imaging data to correct for the phase errors.

2. The method of claim 1 wherein said generating step comprises multiplying the range data from four azimuth bins at each selected range bin.

3. The method of claim 1 further comprising the step of selecting the range bins containing a large energy content from the received range imaging data.

4. The method of claim 1 wherein said phase errors estimating step comprises use of a recursive phase estimating algorithm.

5. The method of claim 4 wherein said recursive phase estimating algorithm is the Bartelt-Lohman-Wirnitzer algorithm.

6. The method of claim 1 wherein said phase error estimating step comprises use of a non-recursive phase estimating algorithm.

7. The method of claim 1 wherein the step of receiving range imaging data comprises receiving range compressed radar imaging data, and the applying a phase correction step comprises applying a phase correction to the received range compressed radar image data.

8. The method of claim 7 wherein said generating step comprises multiplying the range data from four azimuth bins at each selected range bin.

9. The method of claim 7 further comprising the step of selecting the range bins containing a large energy content from the received compressed radar image data.

10. The method of claim 7 wherein said phase error estimating step comprises use of a recursive phase estimating algorithm.

11. The method of claim 10 wherein said recursive phase estimating algorithm is the Bartelt-Lohman-Wirnitzer algorithm.

12. The method of claim 7 wherein said phase error estimating step comprises use of a non-recursive phase estimating algorithm.

13. The method of claim 1 wherein the step of receiving range imaging data comprises receiving range sonar imaging data; and the applying a phase correction step comprises applying a phase correction to the received range imaging sonar data.

14. The method of claim 13 wherein said generating step comprises multiplying the range data from four azimuth bins at each selected range bin.

15. The method of claim 13 further comprising the step of selecting the range bins containing a large energy content from the received range sonar imaging data.

16. The method of claim 13 wherein said phase error estimating step comprises use of a recursive phase estimating algorithm.

17. The method of claim 16 wherein said recursive phase estimating algorithm is the Bartelt-Lohman-Wirnitzer algorithm.

18. The method of claim 16 wherein said phase errors estimating step comprises use of a non-recursive phase estimating algorithm.

19. The method of claim 13 wherein the step of receiving range imaging data comprises receiving range compressed sonar image data, and the applying a phase correction step comprises applying a phase correction to the received range compressed sonar imaging data.

20. A method of correcting phase errors in synthetic aperture imaging data, the steps of the method comprising:
   receiving the range imaging data $g(x)$ at a selected range bin for all azimuths x;
   generating a quadruple product of the received data $g(x)$ at four different azimuths according to $g_4(x_1, x_2, x_3, x_4) = g(x_1)g(x_2)g^*(x_3)g^*(x_4)$;
   where $g^*(x)$ is the complex conjugate of $g(x)$;
   obtaining the phase $\psi_4$ of the quadruple product $g_4(x_1, x_2, x_3, x_4)$ by $$\psi_4(x_1,x_2,0,x_1+x_2)=\phi_e(x_1)+\phi_e(x_2)-\phi_e(0)-\phi_e(x_1+x_2),$$

where $\phi_e$ is the estimated phase error;
   recursively estimating the phase errors by the relationship $\phi_e(i)=\phi_e(j)+\phi_e(i-j)-\psi_4(j,i-j,0,i)$; and
   applying a phase correction to the received range imaging data to correct for the phase error.

21. A method for correcting the phase errors of a wavefront received at an array of multiple sensors, the steps of the method comprising:
   receiving wavefront data $g(x)$ at said multiple sensors where x is sensor location;
   generating a quadruple product of the received data $g(x)$ at four different sensor locations according to the relationship $$g_4(x_1, x_2, 0, x_1+x_2)=g(x_1)g(x_2)g^*(0)g^*(x_1+x_2)$$

where $g^*(x)$ is the complex conjugate of $g(x)$;
   obtaining the phase $\psi_4$ of the quadruple product $g_4(x_1,x_2,0,x_1+x_2)$ by $$\psi 4(x_1,x_2,0,x_1+x_2)=\phi_e(x_1)+\phi_e(x_2)-\phi_e(0)-\phi_e(x_1+x_2);$$

$$\psi_4(x_1,x_2,0,x_1+x_2)=\phi_e(x_1)+\phi_e(x_2)-\phi_e(0)-\phi_e(x_1+x_2);$$

where $\phi_e$ is the estimated phase error;
   recursively estimating the phase error by the relationship $\phi_e(i)=\phi_e(j)+\phi_e(i-j)-\psi_4(j,i-j,0,i)$; and
   applying a phase correction to the data received at each sensor element, except for one reference element.

22. A method of correcting phase errors in sensor array imaging data, the steps of the method comprising:
   receiving range imaging data;
   generating multiple products of sensor locations at selected range bins;
   obtaining the phase of the generated multiple products;
   estimating the phase errors of the received range imaging data using the phase of the generated multiple products; and
   applying a phase correction based on the estimated phase errors to the received range imaging data to correct for the phase errors.

23. The method of claim 22 wherein said generating step comprises multiplying range data from four sensor locations.

24. The method of claim 22 further comprising the step of selecting the range bins containing a large energy content from the received range imaging data.

25. The method of claim 22 wherein said phase errors estimating step comprises use of a recursive phase estimating algorithm.

26. The method of claim 25 wherein said recursive phase estimating algorithm is the Bartelt-Lohman-Wirnitzer algorithm.

27. The method of claim 22 wherein said phase errors estimating step comprises use of a non-recursive phase estimating algorithm.

* * * * *